June 21, 1949.    M. WOLF    2,473,983
DEFLECTION CIRCUIT
Filed March 24, 1943
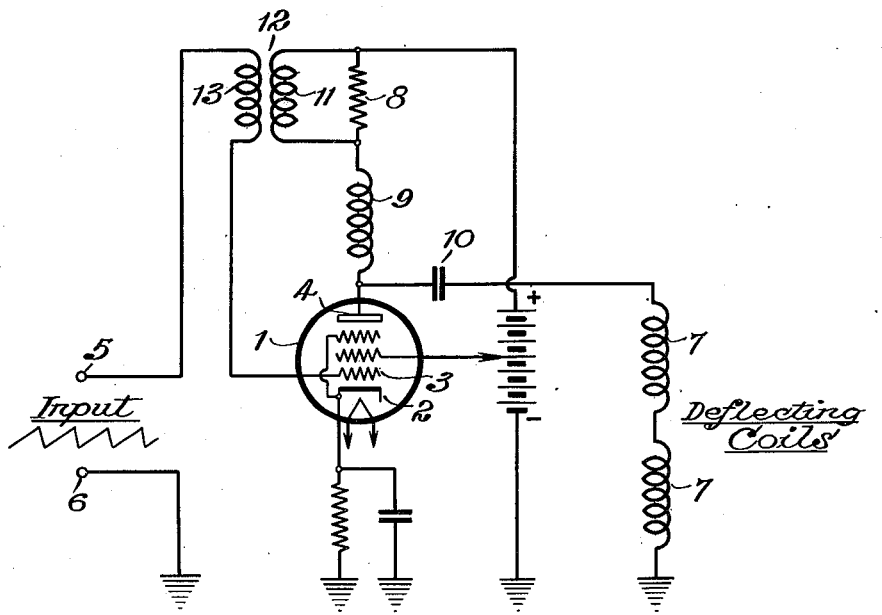
INVENTOR
*Merro Wolf*
BY
*Lee B Kenon*
ATTORNEY Patented June 21, 1949

2,473,983

UNITED STATES PATENT OFFICE 2,473,983

DEFLECTION CIRCUIT

Menno Wolf, Eindhoven, Netherlands, assignor to Hartford National Bank and Trust Company, Hartford, Conn., as trustee Application March 24, 1943, Serial No. 480,360
In the Netherlands April 3, 1941

Section 1, Public Law 690, August 8, 1946
Patent expires April 3, 1961

3 Claims. (Cl. 315—27)

In circuit arrangements for supplying a sawtooth-shaped current to the deflecting coils of a cathode-ray tube these coils are interposed in the anode circuit of an amplifying tube, whose control grid has supplied to it a sawtooth-shaped voltage. In order to prevent the direct anode current from flowing through the deflecting coils, which would involve an undesirable deviation or deflection of the luminous spot on the screen of the cathode-ray tube, the anode voltage is usually supplied to the anode of the tube through a circuit connected in parallel with the deflecting coils. However, the provision of the parallel circuit involves distortion of the sawtooth-shaped current through the deflecting coils. In fact, if the circuit is such that the total anode current is sawtooth-shaped when a sawtooth voltage is applied to the grid of the tube, which is the case when making use of a tube having a high internal resistance, the current through the deflecting coils will generally no longer be sawtooth-shaped, because the current through the parallel circuit is subtracted from the total anode current. Only when the ratio L/R of the parallel circuit corresponds to that of the deflecting coils or when the inductance inserted in the parallel circuit is very high with respect to the inductance of the deflecting coils, the current through the deflecting coil would remain sawtooth-shaped.

However, upon reducing to practice each of the two above-mentioned conditions difficulties are experienced. If, for instance, the parallel circuit is composed in such manner that the ratio L/R thereof corresponds to that of the load circuit, the efficiency of the circuit becomes very bad. In addition, the available grid space of the tube becomes small due to the comparatively high ohmic resistance included in the anode-supply circuit. This may be explained by giving a practical example.

In a cathode-ray tube with magnetic deflection use was made of coils having an inductance of 1.7 henry and an ohmic resistance of 2800 ohms, which coils were fed from an amplifying tube whose average anode current amounted to 70 milliamperes at an anode voltage of 250 volts. If parallel feeding were used in such manner that the inductance and the ohmic resistance in the parallel circuit are equal to those of the deflecting coils, in which case consequently an efficiency loss of 50% will already occur, then an average voltage loss of $0.07 \times 2800 = 196$ volts would occur in the supply circuit.

Even when the inductance in the feed circuit is given a high value with respect to that of the deflecting coil the results are not satisfactory. In fact, if it is desired that the parallel circuit should have a negligibly small influence on the shape of the curve of the current traversing the deflecting coil, an inductance ratio of the order of magnitude of 1:100 is desirable, so that in the example referred to above the inductance included in the parallel circuit will have to amount to about 170 henries. A choke having such an inductance and capable of carrying a direct current of about 70 milliamperes is very clumsy and expensive; moreover, there will arise other causes of distortion due to the unavoidable natural (distributed) capacity and the ohmic resistance, also, will be considerable.

More particularly a high power cathode-ray tube, such as projection tubes, does not permit a satisfactory solution to be arrived at in the manner set out above.

The present invention provides a device by means of which in a circuit arrangement, in which the deflecting coils of a cathode-ray tube are interposed in the anode circuit of an amplifying tube, to whose grid circuit is supplied a sawtooth-voltage and in which the anode voltage is supplied to the anode through a circuit connected in parallel with the deflecting coils, a sawtooth current is obtained in the deflecting coils by supplying, according to the invention, a correcting voltage $$E_c = \frac{I_p}{g_m}$$

with the correct phase to the grid of the amplifying tube, in which $I_p$ represents the alternating component of current in the parallel circuit and $g_m$ the mutual conductance or transconductance of the tube.

The invention will be more fully explained by reference to the accompanying drawing, wherein Figure 1 represents one embodiment thereof.

The circuit represented in the drawing comprises an amplifying tube 1 having a high internal resistance, such as for example a pentode having a cathode 2, a control grid 3 and an anode 4 besides the usual additional elements. A sawtooth voltage is supplied to the input terminals 5 and 6 of the circuit. The anode circuit of the tube 1 comprises deflecting coils 7 which have to be fed with a sawtooth current by the tube 1. The anode voltage of the tube 1 is supplied to the anode 4 of the tube 1 through a circuit which is connected in parallel with the deflecting coils 7 and comprises the series-connection of a resistance 8 and a choke 9. To prevent the direct anode current from flowing through the deflecting coils there is provided a blocking condenser 10. In parallel with the resistance 8 is connected the primary winding 11 of a transformer 12 whose secondary is connected in the grid circuit of tube 1 in series with the input terminals 5 and 6. In accordance with the value of the resistance 8 the transformer 13 is constructed in such manner that the fundamental frequency and the harmonics of the sawtooth current entering into account are transmitted in the same ratio.

According to the invention the values of the resistance 8 and the ratio of transformation of the transformer 12 are chosen in such manner that a correcting voltage $$E_c = \frac{I_p}{g_m}$$

is supplied through the winding 12 to the control grid of the tube, in which expression $I_p$ represents the value of the alternating component of current in the parallel circuit 8, 9 and $g_m$ the mutual conductance of the tube 1. If the phase of the voltage is correctly chosen the wave form of the current through the deflecting coils 7 is perfectly equal to the sawtooth voltage applied between the terminals 5 and 6.

I claim:
1. An electric circuit arrangement comprising a discharge tube having a cathode, a control grid and an anode, means to apply a source of direct current potential to the anode, means to connect the cathode to the negative pole of said source, an inductor and a resistor connected in series with each other and in series with the positive pole of said source and said anode, a coil connected between the anode and cathode, means to apply a saw-tooth voltage between said control grid and cathode, means to derive a potential proportional to the current through said resistor, and means to superimpose in phase opposition said derived potential on the voltage applied to said control grid to produce in said coil a current variation of substantially saw-tooth wave form.

2. An electric circuit arrangement comprising a discharge tube having a cathode, a control grid and an anode, means to apply a source of direct current potential to the anode, means to connect the cathode to the negative pole of said source, an inductor and a resistor connected in series with each other and in series with the positive pole of said source and said anode, a coil connected between the anode and cathode, means to apply a saw-tooth voltage between said control grid and cathode, means to derive a potential proportional to the current through said resistor, said potential being substantially equal to the quotient of the alternating current component of the anode current flowing through said resistor divided by the mutual conductance of the tube, and means to superimpose in phase opposition said derived potential on the voltage applied to said control grid to produce in said coil a current variation of substantially saw-tooth wave form.

3. An electric circuit arrangement comprising a discharge tube having a cathode, a control grid and an anode, means to apply a source of direct current potential to the anode means to connect the cathode to the negative pole of said source, an inductor and a resistor connected in series with each other and in series with the positive pole of said source and said anode, a coil connected between the anode and cathode, means to apply a saw-tooth voltage between said control grid and cathode, means to derive a potential proportional to the current through said resistor, said superimposed potential being substantially equal to the quotient of the alternating current component of the anode current flowing through said resistor divided by the transconductance of the tube, and means comprising a transformer to superimpose in phase opposition said derived potential on the voltage applied to said control grid to produce in said coil a current variation of substantially saw-tooth wave form.

MENNO WOLF.

REFERENCES CITED

The following references are of record in the file of this patent:

UNITED STATES PATENTS

| Number | Name | Date |
|---|---|---|
| 2,077,574 | Maloff | Apr. 20, 1937 |
| 2,085,409 | Bedford | June 29, 1937 |
| 2,086,918 | Luck | July 13, 1937 |
| 2,101,520 | Tolson et al. | Dec. 7, 1937 |
| 2,166,688 | Kell | July 18, 1939 |
| 2,241,762 | Blumlein | May 13, 1941 |
| 2,280,733 | Tolson | Apr. 21, 1942 |
| 2,284,378 | Dome | May 26, 1942 |
| 2,302,161 | Woerner | Nov. 17, 1942 |
| 2,320,551 | Bahring | June 1, 1943 |